May 25, 1926.

C. E. CHILDS 1,585,764

VEHICLE TOP SIDE INCLOSURE

Filed Jan. 31, 1923    2 Sheets-Sheet 1

INVENTOR.
CLARENCE E. CHILDS.
BY A. B. Bowman
ATTORNEY

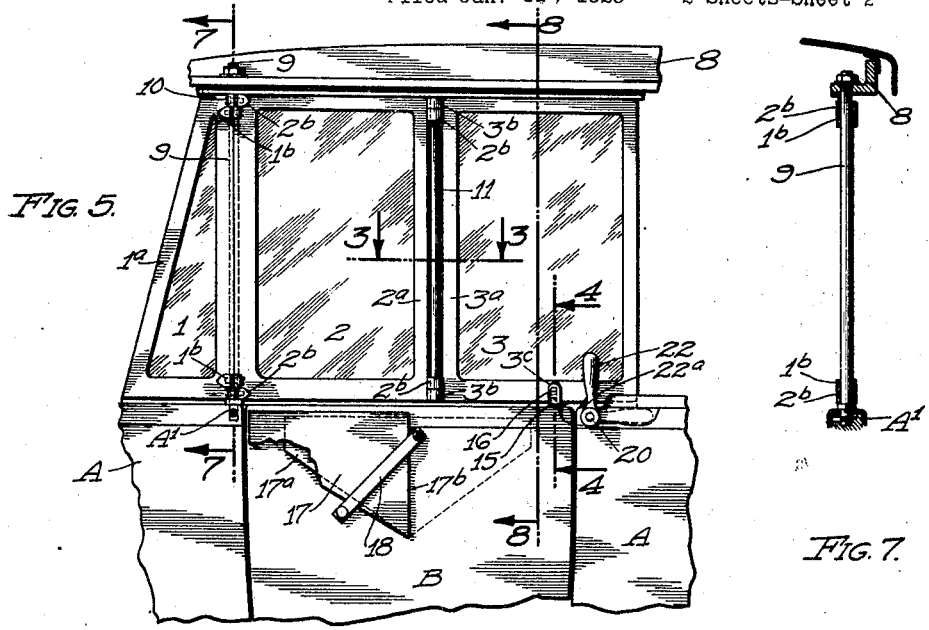
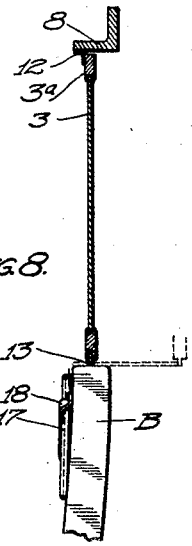
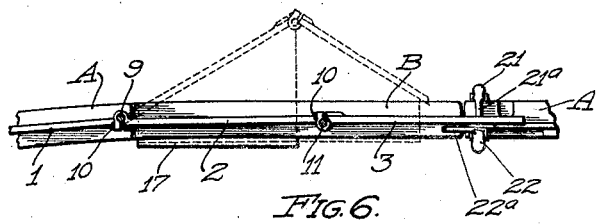
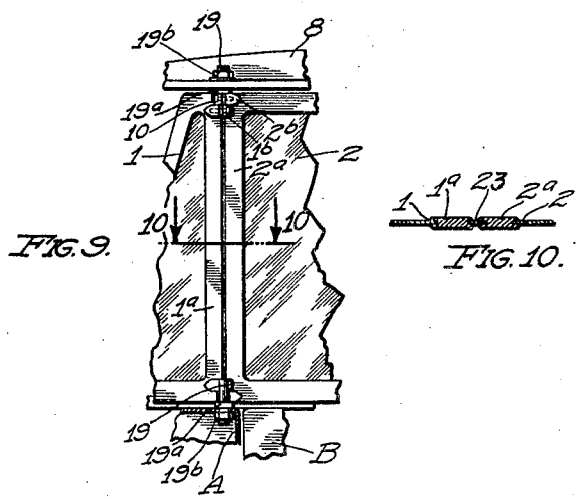

Patented May 25, 1926.

1,585,764

UNITED STATES PATENT OFFICE.

CLARENCE E. CHILDS, OF SAN DIEGO, CALIFORNIA.

VEHICLE TOP SIDE INCLOSURE.

Application filed January 31, 1923. Serial No. 616,051.

My invention relates to side inclosures for vehicles, particularly to those permanently positioned between the main vehicle body and the vehicle top and the objects of my invention are:

First, to provide side inclosures of this class which may be shifted outwardly or opened as desired for ventilating the vehicle; second, to provide inclosures of this class which may be easily opened or shifted outwardly and which may be frictionally retained in this opened or shifted position; third, to provide a means in connection with said inclosures for sealing the spaces between the various members and between the same and the main body portion and the top of the vehicle; fourth, to provide inclosures of this class for either open or closed vehicles which can be opened with the opening of the doors of vehicles, or opened independently of the door; fifth, to provide a means in connection with said inclosures to prevent under-draft from entering the vehicle's inclosed compartment when the inclosures are partly opened; sixth, to provide such means for preventing under-draft which can be easily folded up in position out of the way when not in use; seventh, to provide auxiliary resilient catch or friction means in connection with said inclosures for holding the same in said opened or closed position; eighth, to provide novelly constructed vehicle inclosure apparatus of this class; ninth, to provide vehicle inclosure apparatus of this class which is very simple and economical of construction, light weight, durable, easy to install, adjust and operate, that may be locked as a conventional style sedan, and which will not readily deteriorate, rattle or get out of order.

Figure 1:
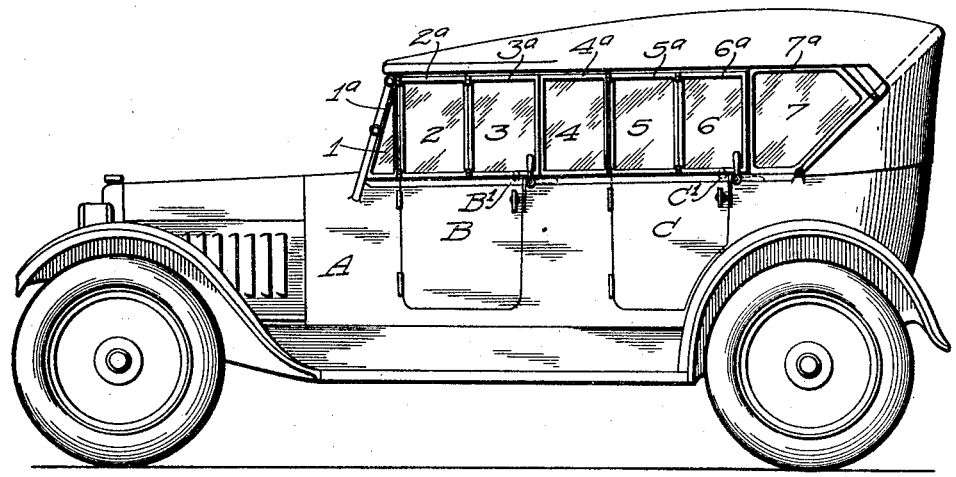
Figure 11:
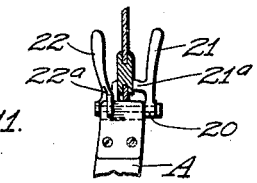
Figure 2:
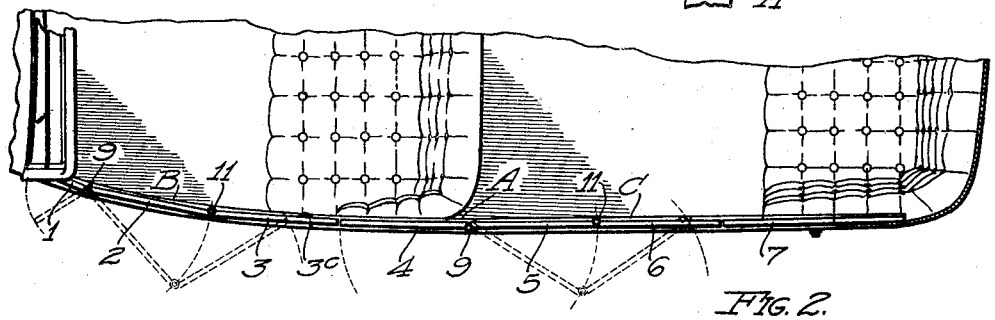
Figure 3:
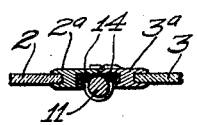
Figure 4:
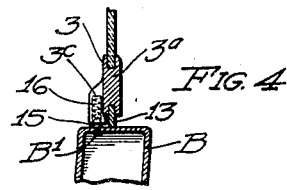

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application, in which:

Figure 1 is a side elevational view of a conventional touring automobile with my side inclosures in closed position thereon; Fig. 2 is an enlarged fragmentary plan view of the vehicle body with the vehicle top portion removed, showing my inclosures in position thereon and showing by dotted line certain open position of said side inclosures; Fig. 3 is an enlarged sectional view taken through 3—3 of Fig. 5; Fig. 4 is an enlarged view taken through 4—4 of Fig. 5, showing the auxiliary catch means for holding the inclosures in certain open position; Fig. 5 is an enlarged side elevational view of the fragmentary portion of the vehicle, taken from the inside thereof, showing the front portion of the inclosures; Fig. 6 is a plan view thereof with the top portion removed, showing by dotted line a certain opened position of the inclosures; Fig. 7 is a sectional elevational view thereof taken through 7—7 of Fig. 5, showing certain parts in elevation; Fig. 8 is another sectional elevational view thereof taken through 8—8 of Fig. 5, showing the outwardly shifted position of the under-draft wing; Fig. 9 is a fragmentary elevational view of a slightly modified form of construction for supporting the inclosures to the vehicle body and top; Fig. 10 is a slightly enlarged sectional view thereof taken through 10—10 of Fig. 9, and Fig. 11 is an enlarged, detailed view of the locking device.

Like characters of reference refer to similar parts and positions throughout the several views of the drawings.

The inclosure panels 1, 2, 3, 4, 5, 6 and 7, support 8, supporting axis member 9, screws 10, axis member 11, jamb members 12, sealing members 13 and 14, latch members 15, springs 16, under-draft wings 17 and the straps 18 constitute the principal parts and portions of my vehicle side inclosures in the preferred form of construction.

The inclosure members 1, 2, 3, 4, 5, 6 and 7 consist of panel members, preferably transparent plates supported in metallic frames 1ª, 2ª, 3ª, 4ª, 5ª, 6ª and 7ª. It is desired to support these panels in sets of three, the members 1, 2 and 3, being supported between the members 1 and 2 by the supporting axis members 9, which are positioned at their lower ends in recesses in the auto body A and at their upper ends in the supports 8 which extend from the front to the rear of the vehicle and are positioned against the top thereof. The panel members 4, 5 and 6 are similarly supported between the panel members 4 and 5 by a supporting axis member 9, which is preferably positioned as shown in Figs. 1 and 2 of the drawings. The panel member 7 is preferably fixed and secured between the body A of the vehicle and the support 8. It will be noted that the axes of the supporting axis members 9 are preferably so positioned relatively to the doors B and C that they are substantially in line with the axes of their hinge supports so that the panels 2 and 3 can be easily opened with the door B of the vehicle and the panels 5 and 6 can be easily opened with the door C. It will also be noted that the combined width of the panels 2 and 3 and of 5 and 6 are substantially the same as the doors B and C of the vehicle. It will be further noted that the panels 2 and 3, and 5 and 6 can be opened independently of the doors B and C of the vehicle if desired. The panel members 1 and 2, and the panel members 4 and 5, are hinged to the supporting axis members 9, so that they can be moved independently of each other. It will be noted that these axis members 9 are rigidly and non-rotatably secured in position. The panels 2 and 3, and the panels 5 and 6 are also hinged relatively to each other by means of the axis member 11, said axis member being preferably fixedly secured to one of the adjacent panel members. The hinge portions $1^b$, $2^b$, and $3^b$, of the respective panels, which support the same to either the supporting axis members 9 or the axis members 11, are made a part of the respective frames of the panels and are preferably split and contracted by the screws 10 so that the friction of the various hinged portions with the supporting axis members may be increased or decreased as desired. A jamb member 12 is secured against the support 8 which serves as a stop for the panel members and also prevents drafts entering over the upper portion of said members. The various panels are provided with grooves on their under sides for the reception of the flexible sealing members 13, preferably of rubber, which seal the space between the various panels and the main portion of the vehicle body. The spaces between the various panels intermediate their hinge portions and the supporting axis members are similarly sealed by flexible sealing members 14 inserted in grooves at the edge of the panel and bear against the axis members 9 or 11 as shown in Fig. 3 of the drawings. Resilient latch means, which consist of ball latch members 15 positioned in recesses $3^c$ of the lower inner edges near the free end of the panel members 3 and 6 respectively, and are forced outwardly, respectively, against the doors B and C of the vehicle by springs 16 positioned behind the same in said recesses. The latch members 15 are adapted to engage recess portions $B^1$ and $C^1$ in the doors B and C and support the panel members 2, 3, 5 and 6 in certain positions.

It will be noted that when the panels 2 and 3 or 5 and 6 are in the position as indicated by dotted line in Fig. 2 of the drawing, a certain under-draft is produced which is very undesirable. To counteract this under-draft I have provided a rigid under-draft wing, 17, secured to the inside of the doors of the vehicle, as shown in Figs. 5, 6 and 8 of the drawings. The rear portions $17^a$ of these wing members are folded, near their middle portions $17^b$, under the front portions, the upper edges of the front portions being hinged near the upper edges of the door, and are secured in such positions to the door by straps 18, extending diagonally across one corner thereof, as shown best in Fig. 5 of the drawings, the straps 18 being detachably secured near one end of said under-draft wing. When desired to use this under-draft wing it is only necessary to unfasten the strap 18, raise the wing member about its upper edge, unfold the portion $17^a$ and draw the panels 2 and 3 or 5 and 6 against and over the outer edges of the same as shown best in Fig. 6 of the drawings.

It will be noted that the panels 1 and 2, and 4 and 5, being hinged to the supporting axis members 9, which are fixed in a rigid, non-rotatable position, may be moved independently of each other.

In order to lock the panels at their free sides I have provided a locking device as illustrated in Fig. 11 of the drawings, which is adapted to lock the panels and the conventional door of the automobile simultaneously and hold them in such locked position, and which may be operated either from the inside or outside of the vehicle. The device consists of a bolt 20 which extends through the body at the upper edge adjacent the door and the free side of one of the panels. On the outer extended end of this bolt 20 is secured a latch handle member 21 which is provided with an inwardly extending lug $21^a$, which is adapted to engage the outer surface of the free side of the panels 3 or 6 when it is in an upright position, as shown in Fig. 11, but when turned down to a horizontal position as shown by dotted lines in Fig. 1 of the drawings, it will be disengaged from said panels, so that said panels may be opened over the same, the lug $21^a$ thereof being adapted to enter a recess in the body of the vehicle and permit the handle member to be positioned horizontally. On the inner end of the bolt 20 is secured another latch handle member 22, shiftable with said bolt and said other latch handle member 21. Said latch handle member 22 is provided with a substantially narrow lug portion $22^a$, extending to the side thereof toward the conventional door of the vehicle and adapted to enter a slot in the edge of said door when the handle member is in a vertical position, as shown in Fig. 5.

In Figs. 9 and 10 of the drawings there are provided slightly modified means for supporting the members 1 and 2, and 4 and 5 by providing short, non-rotatable, pivotal members 19, which are secured rigidly in the body of the vehicle at the lower end and in the support 8, at the upper end, each provided with a collar 19ª and threaded for a nut 19ᵇ for clamping the same, as indicated in the drawing, thus providing a rigid supporting means without a continuous pivotal supporting member. It will also be noted that the sealing member between the adjacent edges of the supported panels in this modified form of construction consist of a single sealing strip 23, secured in one of the panel members and loosely positioned in the frame of the other panel member.

Though I have shown and described a particular construction, combination and arrangement of parts and portions and a certain modification thereof, I do not wish to be limited to this particular construction, combination and arrangement nor to the modification, but desire to include in the scope of my invention the construction, combination and arrangement substantially as set forth in the appended claims.

It is obvious that with this construction there is provided vehicle side inclosures for conventional inclosed vehicles and touring cars which are rigidly supported between the main portion of the vehicle body and the top thereof; which may be easily shifted or opened outwardly and frictionally held in such position, but which may be opened with the conventional vehicle door as an integral part thereof, or independently therefrom, as desired; that there is provided means for sealing the spaces between the side inclosure panels and the top and bottom edges thereof; that there is provided means for eliminating the under-draft, which means may be easily folded up and positioned out of the way; that there is provided latch means for securing panel members in various positions; and that there is provided as a whole, novelly constructed vehicle inclosures, which are very simple and economical of construction, durable, which may be easily installed, adjusted and operated, and which will not readily deteriorate or get out of order.

Having thus described my invention, what I claim as new and desire to secure by Letters Patent is:

1. In a vehicle top side inclosure, the combination with a vehicle body, of an axis means supported at its lower end on the side wall of the vehicle body, panels pivotally and frictionally mounted on said axis means at one edge, another panel pivotally and frictionally secured to the opposite edge of one of said first mentioned panels, and a rigid underdraft wing pivotally mounted near the upper edge of the door of the vehicle body, and adapted to be folded outwardly and to rest on the upper edge of the door and fill the space between the same and one of said first mentioned panels and the panel pivoted thereon when said last mentioned panels are shifted outwardly.

2. An apparatus of the class described, including an axis means supported and fixed at its lower end in the side wall of the vehicle body, panels pivotally mounted on said axis means, substantially in alignment with the axis of rotation of the doors of the vehicle, one of said panels shiftable with said door and also relatively thereto, and a rigid under-draft wing pivotally mounted near the upper edge of the vehicle doors, adapted to be folded outwardly and rest on the upper edge of said doors.

3. In an apparatus of the class described, the combination with a vehicle body, of an axis means supported at the side of the vehicle body, a panel pivotally mounted on said axis means, and a rigid underdraft wing mounted near the upper edge of the door of the vehicle body and adapted to be folded outwardly and to rest on the upper edge of the main portion of the door and fill the space between the same and said panel when the latter is shifted outwardly.

4. An apparatus of the class described, including a fixed axis means, supported at its lower portion in the vehicle body, substantially in alignment with the axis of rotation of the doors of the vehicle, panels pivotally and frictionally mounted on said axis means at one edge another panel pivotally and frictionally secured to the opposite edge of one of said first mentioned panels, a means for detachedly securing one of said panels to a door of said vehicle whereby one of the panels may be opened and closed with the vehicle doors, and a rigid under-draft wing pivotally mounted near the upper side of the vehicle doors, adapted to be folded outwardly and rest on the upper edge of said doors.

5. In a vehicle top side inclosure, the combination with a vehicle body, of a vertical axis member rigidly secured at the upper edge of the main portion of the vehicle body and extended thereabove, a panel member pivotally and frictionally mounted on said vertical axis member and extending backwardly therefrom, another panel member shiftably mounted on the same vertical axis and adapted to extend forwardly therefrom, and another panel member pivotally and frictionally mounted on the free edge of said first mentioned panel member, all of said panel members adapted to swing outwardly only from the vehicle.

6. An apparatus of the class described, including an axis means supported at its upper and lower portions, its lower portion being supported by the vehicle body, a panel pivotally and frictionally mounted at one edge on said axis means, another panel pivotally and frictionally secured to the opposite edge of said first mentioned panel, means for detachedly securing said last mentioned panel members to the vehicle doors, and a rigid under-draft preventing wing pivotally mounted at its upper edge near the upper edge of the vehicle door, adapted to be folded outwardly, cover the space between the panel and the vehicle body and hold said panels in an open position.

7. In a vehicle top side inclosure, the combination with a vehicle body having a door, of a vertical axis member rigidly secured at the upper edge of the main portion of the vehicle body and extended thereabove, a panel member pivotally and frictionally mounted on said vertical axis member and extending backwardly therefrom, another panel member pivotally and frictionally mounted on the free edge of said mentioned panel member and both adapted to swing outwardly from the vehicle body, and means readily connecting said panel member with said door, whereby said panel members may swing with said door or independently thereof.

In testimony whereof, I have hereunto set my hand at San Diego, California, this 24 day of January, 1923.

CLARENCE E. CHILDS